United States Patent [19]
Strehlke

[11] 3,835,131
[45] Sept. 10, 1974

[54] 2-ACYL-5-NITROTHIAZOLE DERIVATIVES
[75] Inventor: Peter Strehlke, Berlin, Germany
[73] Assignee: Schering Aktiengesellschaft, Berlin and Bergkamen, Germany
[22] Filed: June 23, 1972
[21] Appl. No.: 265,467

[30] Foreign Application Priority Data
June 24, 1971  Germany............................ 2131888

[52] U.S. Cl. ...... 260/243 B, 260/247.1, 260/268 C, 260/293.68, 260/294.80, 260/302 R, 260/302 H, 424/180, 424/200, 424/232, 424/296, 424/248, 424/250, 424/264, 424/267, 424/270
[51] Int. Cl............................................. C07d 91/32
[58] Field of Search........ 260/302 H, 302 R, 268 C, 260/293.68, 247.1, 243 B, 294.8 D

[56] References Cited
OTHER PUBLICATIONS
Henry, J. Med. Chem., 12, 303–306 (1969).

*Primary Examiner*—Richard J. Gallagher
*Attorney, Agent, or Firm*—Millen, Raptes & White

[57] ABSTRACT

This invention relates to 2-acyl-5-nitrothiazole derivatives of the formula

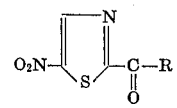

wherein R is amino, piperazine, mono- or bis(hydroxyalkyl)amino or mono- or bis(aminoalkyl)amino, each of which can be unsubsituted or substituted on the oxygen or nitrogen atom by lower alkyl; phenylamino; di-, tri-, tetra-, penta-, hexa-, or heptamethylenimino; morpholino; thiomorpholino; hydroxy or OX wherein X is halogen.

17 Claims, No Drawings

2-ACYL-5-NITROTHIAZOLE DERIVATIVES

BACKGROUND OF THE INVENTION

1. Field of the Invention

This invention relates to 2-acyl-5-nitrothiazoles and to processes for their preparation and use.

2. Description of the Prior Art 5-nitrothiazole derivatives substituted in the 2-position which are useful antibacterial agents have been described in the prior art, e.g., Antibiotics and Chemotherapy 5, 540 (1955) and in J. Med. Chem. 12 : 303 (1969). While suitable for many uses, these compounds exhibit relatively poor antifungal activity and are of limited use as intermediates for the preparation of other biochemically active compounds therefrom.

OBJECTS OF THE INVENTION

Accordingly, it is an object of this invention to provide novel 2-acyl-5-nitrothiazoles.

Another object of this invention is to provide processes for preparing 2-acyl-5-nitrothiazoles.

A further object of this invention is to provide fungicidal compounds and compositions and methods for their use.

An additional object of this invention is to provide valuable intermediates in the production of pharmaceuticals.

Upon further study of the specification and appended claims, further objects and advantages of this invention will become apparent to those skilled in the art.

SUMMARY OF THE INVENTION

These and other objects are attained in one aspect of this invention by providing 2-acyl-5-nitrothiazole derivatives of the Formula I

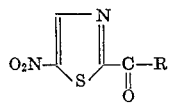

I wherein R is amino, piperazine, mono- or bis(hydroxyalkyl) amino or mono- or bis(aminoalkyl)amino, each of which can be unsubstituted or substituted on the oxygen or nitrogen atom by lower alkyl; phenylamino; di-, tri-, tetra-, penta-, hexa-, or hepta-methylenimino; morpholino; thiomorpholino; hydroxy or OX wherein X is halogen.

DETAILED DISCUSSION

It will be appreciated that modifications within the scope of this invention can be made, e.g., by increasing the number of carbon atoms or the like, provided that such alterations do not adversely affect the desired properties in the resultant compound. In view of this, presently preferred compounds of this invention are those of the above formula in which:

a. R is amino, hydroxy, or OX wherein X is halogen, especially chlorine;

b. R is amino, piperazino, mono- or bis(hydroxyalkyl) amino or mono- or bis(aminoalkyl)amino, unsubstituted on both the oxygen and nitrogen atoms;

c. R is amino, piperazino, mono- or bis(hydroxyalkyl) amino or mono- or bis(aminoalkyl)amino, substituted on the oxygen or nitrogen atom by lower alkyl of 1–6 carbon atoms, especially those compounds in which R is mono- or dialkylamino, N-alkylpiperazine, mono- or bis(alkoxy-alkyl) amino, or mono- or bis(mono- or dialkylaminoalkyl) amino;

d. R is phenylamino; di-, tri-, tetra-, penta-, hexa-, or hepta-methylenimino; morpholino or thiomorpholino.

Compounds of this invention, in addition to those shown in the following Examples, include:

5-nitrothiazole-2-carboxylic acid (2-hydroxy-ethyl)-amide 5-nitrothiazole-2-carboxylic acid bis-(2-hydroxyethyl)-amide 5-nitrothiazole-2-carboxylic acid bis-(2-methoxyethyl)-amide 5-nitrothiazole-2-carboxylic acid (3-aminopropyl)-amide 5-nitrothiazole-2-carboxylic acid bis-(2-aminoethyl)-amide 5-nitrothiazole-2-carboxylic acid bis-(2-diethylaminoethyl)-amide 5-nitrothiazole-2-carboxylic acid thiomorpholide N-(5-nitro-2-thiazolylcarbonyl)-aziridine N-(5-nitro-2-thiazolylcarbonyl)-pyrrolidine N-(5-nitro-2-thiazolylcarbonyl)-heptamethylenimine Since the compounds of this invention are capable of salt formation, Formula I is also intended to represent the corresponding salts. For example, the compound wherein R = OH can exist as the sodium, potassium, or ammonium salt, or as a salt with a physiologically compatible base, while the compounds wherein R is a basic amino group can exist as salts with a physiologically compatible acid, e.g., hydrochloric acid, sulfuric acid, phosphoric acid, acetic acid, propionic acid, lactic acid, succinic acid, tartaric acid, citric acid, benzoic acid, salicylic acid, nicotinic acid, or heptagluconic acid.

The compounds of this invention can be produced from 2-cyano-5-nitrothiazole described in J. Med. Chem. 12 : 303 (1969), by partially hydrolyzing 2-cyano-5-nitrothiazole to the 5-nitrothiazole-2-carboxylic acid amide. The amide can then be decomposed to 5-nitrothiazole-2-carboxylic acid, which can be converted into the 5-nitrothiazole-2-carboxylic acid halide. The halide or an anhydride of 5-nitrothiazole-2-carboxylic acid can be reacted with an amine to form an amide of 5-nitrothiazole-2-carboxylic acid. Any of the thus-obtained compounds can be converted into the physiologically acceptable salts thereof, or correspondingly 5-nitrothiazole-carboxylic acid or a 5-nitrothiazolecarboxylic acid amide can be liberated from the salts.

The partial hydrolysis of 2-cyano-5-nitrothiazole to the 5-nitrothiazole-2-carboxylic acid amide can be accomplished by treatment with an inorganic acid, preferably hydrochloric or sulfuric acid, at temperatures of between about room temperature and 150° C. Generally, the hydrolyzing amount of acid required will be 0,01 to 50 moles, preferably 1 to 10 moles acid per mole of 2-cyano-5-nitrothiazole.

The decomposition of the 5-nitrothiazole-2-carboxylic acid amide is effected by reaction with nitrous acid, or the anhydride or alkyl esters thereof, in an aqueous or non-aqueous inert diluent, preferably by reacting the amide with an alkali nitrite in aqueous inorganic acid. The 5-nitrothiazole-2-carboxylic acid is converted into the 5-nitrothiazole-2-carboxylic acid halide with a suitable acid halide, e.g., thionyl halide, phosphorus trihalide, phosphorus pentahalide, or oxalic acid halide, preferably with thionyl chloride, in an inert solvent and in the presence of a base capable of binding hydrogen halide, e.g., pyridine, advantageously at temperatures below room temperature, e.g., from $-20°$ to $+15°C$.

The anhydride of 5-nitrothiazole-2-carboxylic acid can be obtained from an alkali salt of the acid or from a salt of the acid with a tertiary organic amine base by reaction with another acid halide, preferably an acid chloride and especially by reaction with chloroformic acid alkyl esters, at temperatures of between about $-10°$ and $+30°$ C.

Suitable tertiary organic amine bases include but are not limited to N-ethylmorpholine, trimethylamine, triethylamine, ethyl diisopropylamine, pyridine, and quinoline.

The reaction of the 5-nitrothiazole-2-carboxylic acid halide or anhydride with an amine to form the corresponding amide is conducted optionally in an inert solvent, e.g., benzene, tetrahydrofuran, dioxane or ether, or according to the Schotten-Baumann technique in water.

The novel nitrothiazole derivatives possess valuable pharmaceutical properties, particularly as antibacterial and antifungal agents, and are furthermore suitable as intermediates for the preparation of additional pharmaceuticals.

The compounds of this invention exhibit a pronounced antimicrobial effect, specifically against yeasts, e.g., *Candida albicans* and fungi, e.g., the dermatophytes *Trichophyton mentagrophytes* and *Trichophyton rubrum*.

The MIC (minimum inhibitory concentration) values are set forth in the following table compared with aminitrozole and the commercial preparation "Asterol". MIC's were determined using the serial dilution technique.

TABLE

| R in Formula I | MIC (μg./ml.) against— | | |
|---|---|---|---|
| | Cand. alb. | Trich. ment. | Trich. rubr. |
| —NH₂ | 6.3 | 12.5 | 12.5 |
| —NHCH₃ | 12.5 | 12.5 | 12.5 |
| 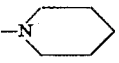 | 50 | 25 | 25 |
| Aminitrozole | >100 | >100 | >100 |
| "Asterol"* | 300 | 50 | 50 |

*"Asterol" = 6-(2-diethylaminoethoxy)-2-dimethylaminobenzothiazole (=Diamthazole dihydrochloride).

Due to their antimicrobial activity, the compounds of this invention are useful and yeast-inhibiting agents in both human and veterinary medicine. They can be employed, e.g., in the topical therapy of mycoses, in substantially the same manner as the known compound "Asterol".

The compounds of this invention can be employed in mixture with conventional excipients, i.e., pharmaceutically acceptable organic or inorganic carrier substances suitable for parenteral, enteral or topical application which do not deleteriously react with the active compounds. Suitable pharmaceutically acceptable carriers include but are not limited to water, salt solutions, alcohols, vegetable oils, polyethylene glycols, gelatin, lactose, amylose, magnesium stearate, viscous paraffin, perfume oil, fatty acid mono-glycerides and diglycerides, pentaerythritol fatty acid esters, hydroxy methylcellulose, polyvinyl pyrrolidone, talc, etc.

For topical application, these are employed, as nonsprayable forms, as viscous to semi-solid or solid preparations comprising a carrier material indigenous to topical formulations and having a dynamic viscosity preferably greater than water. Suitable topical formulations include but are not limited to solutions, suspensions, emulsions, creams, ointments, powders, liniments, salves, and the like, which are, if desired, sterilized or mixed with auxiliary agents, e.g., preservatives, stabilizers, wetting agents, buffers, or salts for influencing osmotic pressure, etc. For topical application, also suitable are sprayable aerosol preparations wherein the active ingredient, preferably in combination with a solid or liquid inert carrier material, is packaged in a squeeze bottle, or in a container in admixture with a pressurized volatile, normally gaseous propellant, e.g., a freon. Usually, the active compounds of the invention are incorporated in topical formulations in a concentration of about 0,1 to 10 weight percent.

The compounds of this invention are generally administered to animals, including but not limited to mammals, e.g., humans, livestock, household pets, etc. A fungicidally effective daily dosage of the active compounds as administered topically generally comprises about 0,1 to 10, preferably 0,5 to 5 mg/cm², of surface area. The dose can be administered singly or as divided dosages throughout the day.

Topical administration is preferred, the compounds of this invention being particularly valuable in the treatment of animals afflicted with tinea corporis, tinea pedis, tinea manuum or tinea inguinalis. The compounds of this invention are substantially valuable in the treatment of candida infections, in contrast to the known compound "Asterol", which is less active against this yeast.

It will be appreciated that the actual preferred amounts of active compounds used will vary according to the specific compound being utilized, the particular compositions formulated, the mode of application, and the particular situs and organism being treated. Optimal application rates for a given set of conditions can be ascertained by those skilled in the art using conventional dosage determination tests in view of the above guidelines.

In addition to the use of these compounds for administration to mammals, they can be employed in admixture with carriers, emulsifiers, soaps, etc. for use as antiseptic solutions, e.g., in conjunction with hospital housekeeping procedures.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, the temperatures are set forth in degrees Celsius. Unless otherwise indicated, all percentages are by weight.

EXAMPLE 1

5 g. of 2-cyano-5-nitrothiazole is heated to the boiling point with 50 ml. of 38 percent hydrochloric acid for 10 minutes. Then, the reaction mixture is allowed to cool, 50 ml. of water is added, and the crystalline precipitate is vacuum-filtered. Product: light-yellow crystals, m.p. 179°–180°. Yield: 5.5 g. of 5-nitrothiazole-2-carboxylic acid amide.

EXAMPLE 2

6 g. of 5-nitrothiazole-2-carboxylic acid amide is suspended at 0° in 24 ml. of concentrated sulfuric acid and mixed with 8 ml. of 50 percent (g./v) sodium nitrite solution. The temperature is maintained between 0° and 5°, and the nitrite solution is gradually added below the level of the solution. Thereafter, the mixture is agitated for 20 hours at room temperature, then poured into 50 ml. of ice water, the crystals are vacuum-filtered and washed thoroughly with water, whereafter the crystals are dried over phosphorus pentoxide. The mother liquor is extracted with ethyl acetate; the latter is shaken with saturated NaCl solution, dried, and evaporated under vacuum (water bath temperature: 30°). The remaining crystals are combined with the vacuum-filtered crystallizate, thus obtaining 6 g. of 5-nitrothiazole-2-carboxylic acid, m.p. 100°–102° (under vigorous decarboxylation).

EXAMPLE 3

2 g. of 5-nitrothiazole-2-carboxylic acid is dissolved in 100 ml. of absolute ether and mixed under thorough agitation at 0° with 0.93 ml. of pyridine. The mixture is stirred for 5 minutes, and 0.83 ml. of thionyl chloride is added dropwise at 0°. Then, the reaction mixture is agitated for 2 hours at 0°, vacuum-filtered under the exclusion of moisture, and the filtrate is evaporated under vacuum at a water bath temperature of 30°. The residual yellow oil solidifies spontaneously. Yield: 1.9 g. of 5-nitrothiazole-2-carboxylic acid chloride. The infrared spectrum shows a carbonyl band at 1,750 cm$^{-1}$, the substance melts at 68°–72° under strong decomposition.

EXAMPLE 4

500 mg. of 5-nitrothiazole-2-carboxylic acid is dissolved in 22 ml. of absolute ether and 7 ml. of absolute tetrahydrofuran and gradually mixed at 0° with 0.4 ml. of N-ethylmorpholine. Then, 0.38 ml. of the isobutyl ester of chloroformic acid is quickly added thereto, and the mixture agitated for 15 minutes at 0°. Thereafter, the solution is mixed with 0.26 ml. of morpholine and agitated for another two hours at 0°, whereupon the reaction mixture is poured on 1N H$_2$SO$_4$ and extracted with ethyl acetate. The ethyl acetate phase is washed with water and sodium bicarbonate solution, dried over sodium sulfate, and evaporated. The remaining oil becomes crystalline when triturated with ether. The reaction product is recrystallized from ether, thus obtaining 380 mg. of 5-nitrothiazole-2-carboxylic acid morpholide, m.p. 113°–115°.

EXAMPLE 5

Analogously to Example 4, with the use of 0.3 ml. of piperidine in place of morpholine, 360 mg. of 5-nitrothiazole-2-carboxylic acid piperidide is obtained, m.p. 91°–92° (from ether).

EXAMPLE 6

Analogously to Example 4, but using 0.3 ml. of diethylamine, one obtains 210 mg. of 5-nitrothiazole-2-carboxylic acid diethylamide, m.p. 76° (from cyclohexane).

EXAMPLE 7

In analogy to Example 4, utilizing 0.3 ml. of n-butylamine, 264 mg. of 5-nitrothiazole-2-carboxylic acid n-butylamide is produced, m.p. 94°–95° (from ether).

EXAMPLE 8

Analogously to Example 4, with 0.27 ml. of aniline, one obtains 500 mg. of 5-nitrothiazole-2-carboxylic acid anilide, m.p. 201°–202° (from ether).

EXAMPLE 9

300 mg. of 5-nitrothiazole-2-carboxylic acid chloride is dissolved in 3 ml. of benzene and mixed with 0.175 ml. of N-methylpiperazine. The crystals are vacuum-filtered, thus producing 300 mg. of 5-nitrothiazole-2-carboxylic acid N-methylpiperazide hydrochloride, m.p. 280°–284° (from ethanol; strong sublimation).

EXAMPLE 10

Analogously to Example 9, using 0.2 ml. of 2-diethylaminoethylamine, 250 mg. of 5-nitrothiazole-2-carboxylic acid 2-diethylaminoethylamide hydrochloride is produced, m.p. 184°–189° (from ethanol).

EXAMPLE 11

600 mg. of 5-nitrothiazole-2-carboxylic acid chloride is dissolved in 7 ml. of benzene and mixed, under ice cooling, with 560 mg. of 2-ethoxyethylamine in 5 ml. of benzene. The mixture is allowed to stand for 10 minutes at room temperature; then the solution is poured on 1N sulfuric acid, and extracted with the addition of ethyl acetate. The organic phase is washed with potassium bicarbonate solution, dried, and concentrated by evaporation, thus obtaining 600 mg. of 5-nitrothiazole-2-carboxylic acid (2-ethoxyethyl)-amide, m.p. 90° (from ethanol).

EXAMPLE 12

600 mg. of 5-nitrothiazole-2-carboxylic acid chloride is dissolved in 7 ml. of benzene and added to 620 mg. of an ice-cold, aqueous 35 percent methylamine solution. The mixture is thoroughly shaken and immediately worked up as described in Example 11, thus obtaining 400 mg. of 5-nitrothiazole-2-carboxylic acid methylamide, m.p. 189° (from ethanol).

EXAMPLE 13

Ointment for External Application Having the Following Composition:

0.50 percent 5-nitrothiazole-2-carboxylic acid amide 5.00 percent Beeswax, white, D.A.B. (German Pharmacopoeia) 6

5.00 percent Lanolin, anhydrous, D.A.B. 6
20.00 percent Vaseline, white, D.A.B. 6
25.00 percent water/oil cream foundation Amphocerin K "Dehydag"
14.48 percent Paraffin, liquid, D.A.B. 6
30.00 percent Water, desalinated
0.02 percent perfume oil Chypre No. 6466, Haarmann & Reimer

EXAMPLE 14

Ointment for External Application Having the Following Composition:
1.00 percent 5-nitrothiazole-2-carboxylic acid methylamide
5.00 percent Beeswax, white, D.A.B. 6
5.00 percent Lanolin, anhydrous, D.A.B. 6
20.00 percent water/oil cream foundation Vaseline, white, D.A.B. 6
25.00 percent Amphocerin K "Dehydag"
13.98 percent Paraffin, liquid, D.A.B. 6
30.00 percent Water, desalinated
0.02 percent perfume oil Chypre No. 6466, Haarmann & Reimer

What is claimed is:
1. A 5-nitrothiazole derivative of the formula

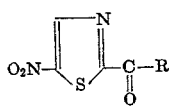

wherein R is amino, piperazino, mono- or bis(hydroxyalkyl) amino or a mono- or bis(aminoalkyl)amino wherein alkyl is of 2–6 carbon atoms, each of which is unsubstituted or substituted on the oxygen or nitrogen atom by lower alkyl of 1–6 carbon atoms; phenylamino; di-, tri-, tetra-, penta-, hexa-, or heptamethylenimino; morpholino; or thiomorpholino, and the physiologically compatible salts thereof.

2. A compound according to claim 1 wherein R is amino.

3. A compound according to claim 1 wherein R is mono- or dialkylamino, N-alkylpiperazino, mono- or bis(alkoxyalkyl)amino, or mono- or bis(mono- or dialkylaminoalkyl)amino.

4. A compound of claim 1 in the form of a physiologically compatible salt thereof.

5. A compound of claim 1, 5-nitrothiazole-2-carboxylic acid amide.

6. A compound of claim 1, 5-nitrothiazole-2-carboxylic acid morpholide.

7. A compound of claim 1, 5-nitrothiazole-2-carboxylic acid piperidide.

8. A compound of claim 1, 5-nitrothiazole-2-carboxylic acid diethylamide.

9. A compound of claim 1, 5-nitrothiazole-2-carboxylic acid n-butylamide.

10. A compound of claim 1, 5-nitrothiazole-2-carboxylic acid anilide.

11. A compound of claim 1, 5-nitrothiazole-2-carboxylic acid N-methylpiperazide hydrochloride.

12. A compound of claim 1, 5-nitrothiazole-2-carboxylic acid 2-diethylaminoethylamide hydrochloride.

13. A compound of claim 1, 5-nitrothiazole-2-carboxylic acid (2-ethoxyethyl)-amide.

14. A compound of claim 1, 5-nitrothiazole-2-carboxylic acid methylamide.

15. A compound of claim 1, wherein R is amino, piperazino, mono— or bis(hydroxyalkyl)amino or mono— or bis (aminoalkyl)amino, unsubstituted on both the oxygen and nitrogen atoms.

16. A compound of claim 1, wherein R is amino, piperazino, mono— or bis(hydroxyalkyl)amino or mono— or bis (aminoalkyl)amino, substituted on the oxygen or nitrogen atom by lower alkyl of 1–6 carbon atoms.

17. A compound of claim 1, wherein R is phenylamino; di—, tri—, tetra—, penta—, hexa—, or heptamethylenimino; morpholino or thiomorpholino.

* * * * *